Sept. 12, 1972   E. GORIN ETAL   3,690,818
CYCLIC PROCESS FOR REMOVAL OF SO₂ FROM FLUE GAS
Filed March 29, 1971   3 Sheets-Sheet 1

INVENTORS
E. GORIN
P. M. YAVORSKY

INVENTORS
E. GORIN
P.M. YAVORSKY

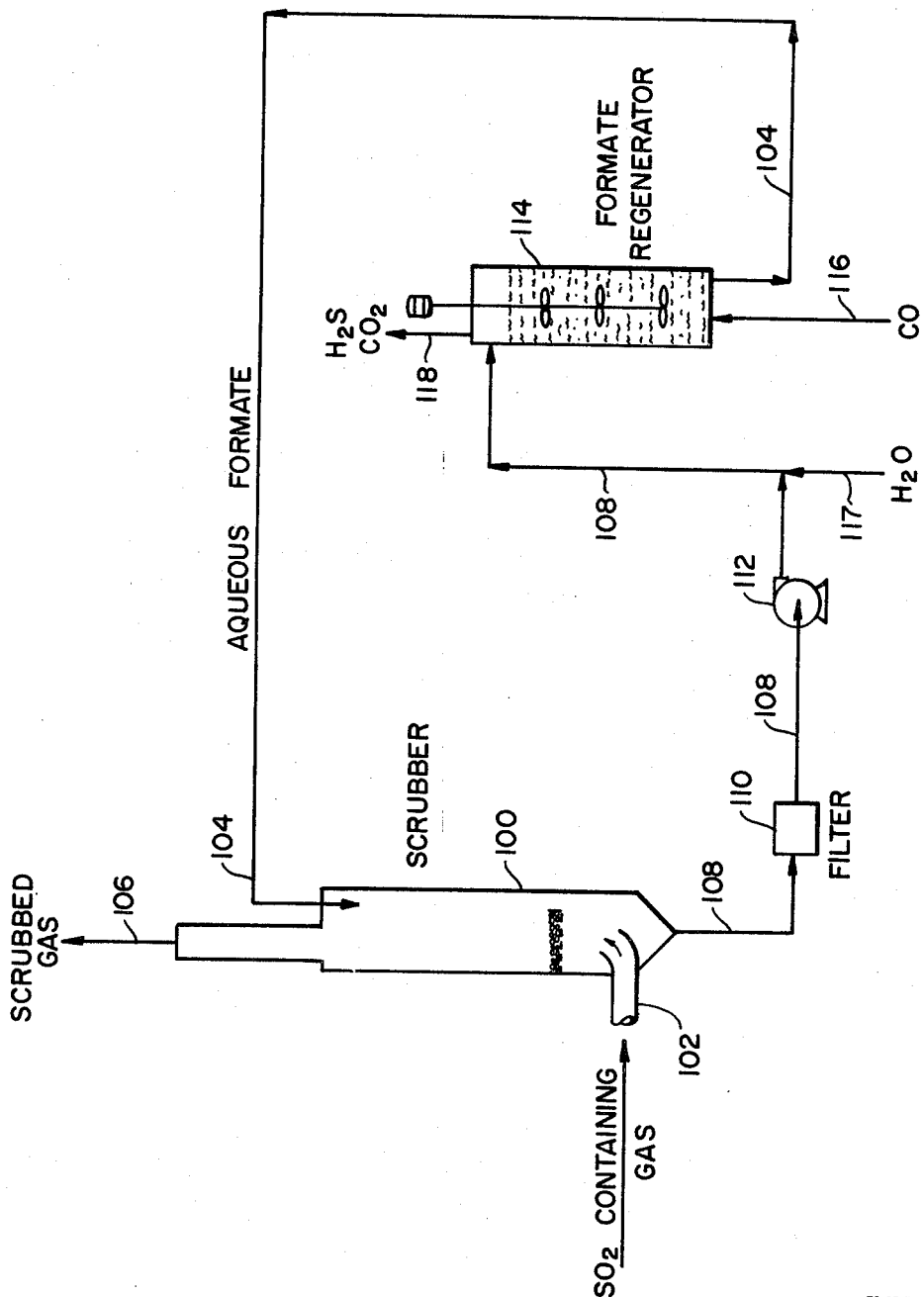

United States Patent Office 3,690,818
Patented Sept. 12, 1972

3,690,818
CYCLIC PROCESS FOR REMOVAL OF
SO₂ FROM FLUE GAS
Everett Gorin, Pittsburgh, and Paul M. Yavorsky, Monongahela, Pa., assignors to Consolidation Coal Co., Pittsburgh, Pa.
Continuation-in-part of applications Ser. No. 879,223 and Ser. No. 879,224, both Nov. 24, 1967, which are continuations-in-part of application Ser. No. 667,479, Sept. 13, 1967. This application Mar. 29, 1971, Ser. No. 128,782
Int. Cl. B01d 53/34; C01b 17/64; C07c 53/06
U.S. Cl. 423—243  5 Claims

ABSTRACT OF THE DISCLOSURE

A cyclic process including absorption of SO₂ from a flue gas by means of an absorbent containing potassium formate, sodium formate, or ammonium formate at a temperature above 140° F., and regeneration of the spent absorbent by treatment with selected reducing agents, specifically, potassium formate, sodium formate or ammonium formate, and carbon monoxide at a temperature above 475° F., either concurrently or sequentially.

CROSS-REFERENCES TO RELATED APPLICATIONS

This application is a continuation-in-part of application Ser. No. 879,223, filed Nov. 24, 1969, and now abandoned, and of application Ser. No. 879,224, filed Nov. 24, 1969, now Pat. No. 3,584,042, both assigned to the assignee of the present application. Both of said applications, Ser. Nos. 879,223 and 879,224 are, in turn, continuations-in-part of application Ser. No. 667,479, filed Sept. 13, 1967, and now abandoned. Other related applications are application Ser. No. 47,040, filed June 17, 1970 by N. J. Mazzocco, E. Gorin and P. M. Yavorsky, now Pat. No. 3,592,850; and application Ser. No. 128,750, filed Mar. 29, 1971 by P. M. Yavorsky and E. Gorin.

BACKGROUND OF THE INVENTION

Field of the invention

The present invention relates to a cyclic method of removing sulfur dioxide from gases, particularly from industrial gases which contain only a very small amount, i.e. less than 2 percent by volume, of sulfur dioxide, such as flue gases which are formed in the burning of sulfur-containing coal or oil, and also in certain metallurgical processes.

Description of the prior art

Wet scrubbing of flue gas with suitable sulfur dioxide absorbents is an extremely effective method of removing SO₂. Many different chemical compounds have been suggested and tried as absorbents in the liquid state for the removal of SO₂ from flue gas. Unfortunately, most of these are not suitable for use at high temperature.

The wet scrubbing methods which operate at low ambient temperatures suffer from the so-called "plume" problem. The low buoyancy of the gas resulting from scrubbing at substantially ambient temperatures requires that almost quantitative removal of SO₂ be effected. Otherwise, due to poor dispersion of the flue gas and the resultant plume, the ground level contamination may be even worse than without scrubbing. The scrubbed flue gas may be reheated to elevated temperatures before release to the atmosphere, but such reheating is expensive.

In most utility stations, the flue gas exiting from the air preheater and entering the stack has a temperature in the range of 250–350° F. The high temperature facilitates plume rise. It would be desirable to scrub this gas for SO₂ removal without substantial cooling, to insure plume rise without costly reheat. Accordingly, the scrubbing medium should be a liquid which tolerates high temperatures. Sodium, potassium and ammonium formates in the liquid state are such liquids.

The reaction of sulfur dioxide (SO₂) or sulfurous acid (H₂SO₃) with formates is not a new one. Illustrative patents which directly or indirectly relate to such reaction include the following:

U.S. Pat. No. 1,036,705, issued Aug. 27, 1912
U.S. Pat. No. 1,166,160, issued Dec. 28, 1915
U.S. Pat. No. 2,010,615, issued Aug. 6, 1935
U.S. Pat. No. 2,031,802, issued Feb. 25, 1936
British Pat. No. 11,010, A.D. 1913
British Pat. No. 134,943, Nov. 17, 1919

The alkali metal and alkaline earth salts of formic acid in aqueous solutions have been proposed as wet absorbents of sulfur dioxide (Japanese Pat. No. 172,814, issued May 31, 1946). The sulfur dioxide is absorbed at ambient temperatures below 50° C., according to the following illustrative reaction:

(1) 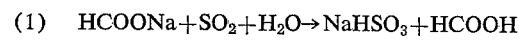    $HCOONa + SO_2 + H_2O \rightarrow NaHSO_3 + HCOOH$

The patent further teaches that the sulfur dioxide may be released by simply heating the solution to a temperature above 55° C., and preferably nearer 70° C.

SUMMARY OF THE INVENTION

Cyclic process

In accordance with the present invention, a cyclic process is provided for continuously removing sulfur dioxide from flue gas which includes absorption of the SO₂ by a liquid absorbent and regeneration of the spent liquid absorbent. The absorption is effected by passing the SO₂-containing flue gas in contact with sodium formate, potassium formate, or ammonium formate in a liquid state at a temperature above 140° F., but below the decomposition temperature of the formate, and preferably below 475° F. The spent absorbent is sent to regeneration before all the formate has been consumed, that is, preferably before more than 25 percent by weight of the formate has been consumed. In the regeneration part of the cyclic process, the spent absorbent, still containing unused formate, is converted back to fresh formate by heating the spent absorbent above 475° F., preferably above 600° F., and passing a reducing gas containing CO through the liquid absorbent, whereby the absorbent is made effective again for absorption of SO₂.

Absorption

With respect to the SO₂ absorption part of the cyclic process, the formate may be dissolved in any chemically inert solvent which is liquid at the selected temperature of absorption. Water is the preferred solvent. However, the formate may be used in the molten state. For example, we have found a suitable wet absorbent to be the eutectic mixture containing 96 percent potassium formate and 4 percent sodium formate which melts at 320° F., i.e. 13° F. below the melting point of the pure potassium salt. The sulfur dioxide in the flue gas reacts very rapidly and completely with the formate to form principally the corresponding alkali metal thiosulfate at temperatures above 140° F. and up to 475° F., as shown in the following equation:

(2)     $2MCOOH + 2SO_2 = M_2S_2O_3 + 2CO_2 + H_2O$ where M is Na, K or NH₄.

The reaction is an oxidation-reduction reaction rather than an acid-base reaction, as set forth in the above-cited Japanese patent.

At temperatures above 475° F., undesirable secondary reactions of the thiosulfate formed by reaction (2) above occur, and increase in rate as the temperature is raised. Accordingly, the temperature is generally maintained below 475° F. during $SO_2$ absorption.

Significant quantities of $M_2S$, MHS, minor amounts of $M_2SO_4$, and occasionally some $M_2SO_3$ and elemental sulfur may also be produced. The amounts of these by-products depend on the conditions employed in the absorption or scrubbing step. The formation of by-products is minimized by reduction of temperature and residence time. At temperatures below 400° F., the formation of $H_2S$ in the scrubbing reaction appears to be completely inhibited, especially when $M_2CO_3$ is present in the formate. For this reason, its presence may be desirable, though it is clear that carbonate is not necessary for absorption of $SO_2$ by the formates.

Generally speaking, we prefer to use aqueous formate solutions rather than the molten salts as absorbents. The three basic advantages of the aqueous system are (1) complete elimination of evolution of $H_2S$ into the scrubbed flue gas (which sometimes happens in the case of the melt system at high temperature), (2) operation under conditions where no insoluble salts are precipitated, and (3) a much less serious corrosion problem.

The aqueous formate solutions may be conveniently used within the temperature range 140 to 250° F., preferably within the range 150 to 225° F. The higher the operating temperature, the higher the salt concentration that is required to prevent evaporation. Because of the very high solubility of potassium and ammonium formates, concentrations up to 90 weight percent may be used, but 70 to 85 weight percent is preferred over the temperature range 170 to 200° F. In the case of aqueous sodium formate, lower concentrations are used because of the lower solubility of the sodium salt. Concentrations of about 55 to 60 weight percent are preferred over the temperature range of about 160 to 170° F.

The use of the formates in molten form does permit efficient removal of $SO_2$ from hot flue gas without any cooling of the flue gas. The melting point of potassium formate is 333° F. The $SO_2$ absorption may be conducted at a temperature above 350° F., but preferably below 475° F. Above 475° F., some $H_2S$ is evident, thus defeating the primary purpose of desulfurizing the flue gas. Somewhat lower temperatures may be achieved in potassium formate melt systems if other salts are added which depress the melting point of the potassium formate. The addition of small amounts of sodium formate effects such a melting point depression. Likewise, operation at somewhat reduced temperatures is possible by addition of small amounts of water. For example, we have found that 98% KCOOH–2% $H_2O$ forms a homogeneous liquid at 310° F. and has a sufficiently low vapor pressure of water at the above temperature to be useful as a scrubbing fluid for flue gas.

The melting point of sodium formate is 489° F., which is below its initial thermal decomposition point of 600° F. However, to avoid introduction of substantial amounts of $H_2S$ into the flue gas, it is necessary to operate with sodium formate at temperatures below 475° F. Thus, its admixtures with other salts or inert solvents which depress the melting point are used.

The melting point of ammonium formate is 240° F., which is above the temperature at which it starts to decompose, i.e. 170° F. Accordingly, for all practical purposes, its use as absorbent is limited to temperatures below 170° F. and to solutions, as distinguished from melts. While this limitation is a disadvantage, ammonium formate does have the advantage of being extremely soluble in water, so that solutions having concentrations as high as 90 weight percent or more may be used.

Regeneration

Regeneration of the spent absorbent requires the conversion of the thiosulfate formed in the absorption step (see Equation 2) to fresh formate. The principal reactions involved in effecting such conversion are first, the conversion of the thiosulfate to carbonate, and second, the conversion of the carbonate to the desired formate.

The conversion of the thiosulfate to carbonate is effected by the excess formate which is not consumed by the $SO_2$ absorption (Equation 2) after removal of the scrubbing product (spent absorbent) from flue gas contact and may be expressed by the following Equation 3:

(3)  $M_2S_2O_3 + 4MCOOH = 3M_2CO_3 + 2H_2S + CO_2$

The reaction expressed by Equation 3 is actually a simplified expression of two sequential conversions, namely, the conversion of the thiosulfate to sulfides, followed by the conversion of the sulfides to $H_2S$. The conversion to sulfides may be expressed by the following Equations 3A and 3B:

(3A)  $M_2S_2O_3 + 4MCOOH = 4MHCO_3 + 2MSH$ and (3B)  $M_2S_2O_3 + 4MCOOH = M_2CO_3 + 2M_2S + 3CO_2 + H_2O$ The conversion of the sulfides to $H_2S$ may be expressed by the following Equations 3C and 3D:

and (3C)  $MSH + CO_2 + H_2O = MHCO_3 + H_2S$ and (3D)  $M_2S + CO_2 + H_2O = M_2CO_3 + H_2S$ The $MHCO_3$ produced by the reactions set forth in Equations 3A and 3C is, itself, converted to carbonate by reaction with MSH, as expressed by the following Equation 3E:

(3E)  $MHCO_3 + MSH = M_2CO_3 + H_2S$

Thus, the principal products of the thiosulfate reduction to carbonate are the carbonate and $H_2S$. However, in actual practice, there will generally be present some MSH, $MHCO_3$, and $M_2S$. Any feasible commercial process should take cognizance of these minor products, as will be shown later.

The conversion of the carbonate to formate is effected by reduction of the carbonate by carbon monoxide with or without hydrogen present. Without hydrogen, but with water present, the reaction may be expressed by the following equation:

(4)  $M_2CO_3 + 2CO + H_2O = 2MCOOH + CO_2$

With hydrogen present, and in the substantial absence of water, the reaction is as follows:

(5)  $M_2CO_3 + CO + H_2 = 2MCOOH$

Reaction 4 is substantially non-catalytic and proceeds at temperatures as low as 300° F. The upper temperature limit is imposed only by the necessity of avoiding decomposition of the formate. The preferred temperature range is 475 to 550° F. Reaction 5 is catalytic at low temperature, but generally does not require a catalyst at high temperature, the overall temperature range being 300 to 800° F., but preferably 500 to 600° F. with catalyst and 600 to 700° F. with no catalyst. Suitable catalysts include the transition group metals and sulfides and the Group VI metal sulfides. The metals and metal sulfides may be used directly or on a suitable catalyst support. The pressure in the reactions of Equations 4 and 5 should be between 200 and 3000 p.s.i.g., preferably above 500 p.s.i.g.

The rate of thermal decomposition of the formate, i.e. the reverse of the reaction of Equation 5, increases with temperature, and it is naturally desirable to minimize this reaction. This may be done by applying sufficient partial pressure of CO and $H_2$ to prevent reversal of the reaction of Equation 5. We have found that the application of pressures of CO and $H_2$ as a function of temperature as shown in Table I below.

TABLE I

Equilibrium Pressures of CO and $H_2$

| Temperature, °F | 600 | 635 | 670 | 700 |
|---|---|---|---|---|
| CO + $H_2$ pressure (p.s.i.a.) | 435 | 650 | 890 | 1,230 | is sufficient to prevent decomposition of the formate. In general, satisfactory rates are obtained if the total pressure of CO and $H_2$ exceeds the equilibrium pressure by about 1000 p.s.i.g.

With respect to the minor products formed in the conversion of the thiosulfate to carbonate, at least a fraction of the $M_2S$ formed in the reaction of Equation 3B is converted to $H_2S$ and $M_2CO_3$ by the action of $CO_2$ and steam (Equation 3D) which are liberated in the reaction of Equation 3B. The $M_2S$ may be completely converted to $M_2CO_3$ by conventional techniques by using additional quantities of $CO_2$ and steam. Similarly, at least a fraction of the MSH formed by the reaction of Equation 3A is converted to $H_2S$ and $M_2CO_3$ by the action of $CO_2$ and steam (Equations 3C and 3E). However, we have found that MSH can be converted to formate (MOOCH) and $H_2S$ by the reaction of CO and steam. This reaction may be expressed by the following Equation 6:

(6)   $MSH + CO + H_2O = MOOCH + H_2S$

All these reactions of the minor products have a bearing on the selection of the specific process for regenerating the spent absorbent, as will be seen in the later discussion of such processes.

The $H_2S$ formed in both the principal and minor regeneration reactions can be converted to elemental sulfur by existing industrial processes, for example, the Claus process.

Regeneration may be accomplished in one, two, or three separate zones, as will be seen later. However, regardless of how many zones are employed, the conversion of the spent absorbent to fresh formate is obtained by a combination of heat and reducing gas, either simultaneously or sequentially. In its simplest embodiment, regeneration is effected by heating the partially spent absorbent above 475° F., preferably above 500° F. while passing a reducing gas containing CO through the heated liquid. This embodiment may be called a one-zone or one-stage regeneration process. The two-zone or two-stage process conducts each of the principal reduction reactions in separate zones. That is, the conversion of thiosulfate to carbonate is conducted in a first zone, and the conversion of carbonate to formate is conducted in a second zone. The three-zone or three-stage process differs from the two-zone by having a stripping zone in between the two reduction zones to remove $H_2S$ and to convert residual quantities of $M_2S$, MHS, and $MHCO_3$ to carbonate and $H_2S$ by reaction with $CO_2$ and $H_2O$.

The selection of one of the three regeneration processes for use commercially is a function of cost and extent of conversion of all the sulfur forms in the spent absorbent to formate and $H_2S$. The one-zone process offers obvious cost advantage, but is more difficult to control precisely.

DESCRIPTION OF THE DRAWINGS

For a better understanding of our invention, its objects and advantages, reference should be had to the accompanying drawings in which

FIG. 3 is a schematic flowsheet of the modification of the process of this invention which includes the one-zone regeneration process.

DESCRIPTION OF THE PROCESS WITH THREE-ZONE REGENERATION

Figure 1:
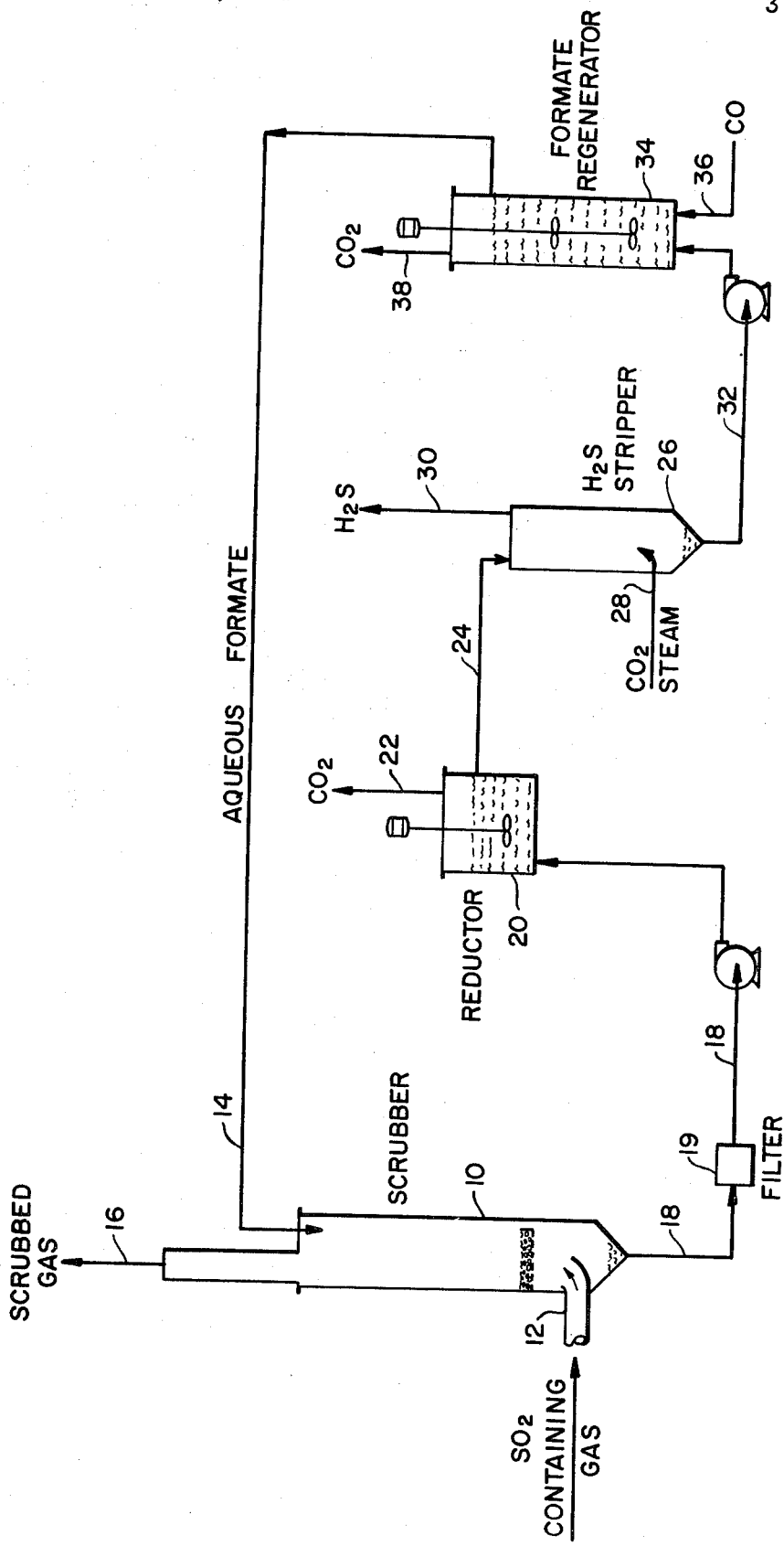
FIG. 1 is a schematic flowsheet of the embodiment of our process which includes the three-zone regeneration process.

Referring to FIG. 1 of the drawings, $SO_2$-containing gas is introduced into the bottom of a scrubber 10 through a conduit 12, while concentrated aqueous potassium formate (e.g. 70–75 percent) is fed into the top of the scrubber through a conduit 14. The scrubber may be any conventional gas-liquid scrubbing tower designed to assure contact of the $SO_2$-containing gas at elevated temperatures with the selected formate in a liquid state. We prefer to use a jiggling bed of marbles through which the gas and liquid pass in countercurrent flow relationship. The temperature within the scrubber is preferably maintained between 170 and 200° F. when concentrated aqueous potassium formate is the absorbing agent. This temperature range has the advantage of eliminating the need for reheat of the scrubbed gases when they are released to the atmosphere. The scrubbed gas, freed of $SO_2$, or substantially so, is discharged through a stack 16 as clean stack gas.

The relative amounts of $SO_2$-containing gas and formate passing through the scrubber are regulated to provide for considerable excess of the formate, so that less than 25 percent by weight of the formate is converted to the thiosulfate in accordance with the reaction expressed by Equation 1. Accordingly, the major constituents of the effluent liquid stream leaving the bottom of the scrubber through conduit 18 are aqueous potassium formate and potassium thiosulfate. These are pumped by conduit 18 through a filter 19 (to remove any entrained solids, e.g. ash or insoluble by-products) to a stirred reductor vessel 20 wherein the excess formate is used to reduce the thiosulfate. The temperature within the reductor is maintained at about 540° F. while the pressure, which is self-generated, is held at about 500 p.s.i.g. The required reaction time is about 20 minutes. The gaseous product $CO_2$ is discharged from the reductor through a pipe 22.

The products from the reductor which are in aqueous solution are transferred through a conduit 24 to a so-called $H_2S$ stripper multiple plate tower 26, into the bottom of which is also introduced a stream of $CO_2$ and steam via a conduit 28. The $CO_2$ and steam react with the $K_2S$ and KHS in the aqueous solution at the maintained temperature of 230–270° F. and 10 p.s.i.g. to produce $K_2CO_3$ and $H_2S$. The gaseous $H_2S$ is discharged through a stack 30 to a suitable recovery or processing plant (not shown). The aqueous solution of $K_2CO_3$ is pumped through a conduit 32 to a stirred formate regenerator vessel 34 where the aqueous $K_2CO_3$ is reconverted to aqueous KCOOH by reaction with CO introduced through a conduit 36. The temperature maintained in the regenerator is about 540° F., and the pressure held at about 1000 p.s.i.g. The residence time is about one hour. The gaseous product $CO_2$ is discharged through a stack 38, while the regenerated aqueous formate is recycled to the scrubber through the conduit 14, after suitable adjustment of its concentration.

DESCRIPTION OF THE PROCESS WITH TWO-ZONE REGENERATION

Figure 2:
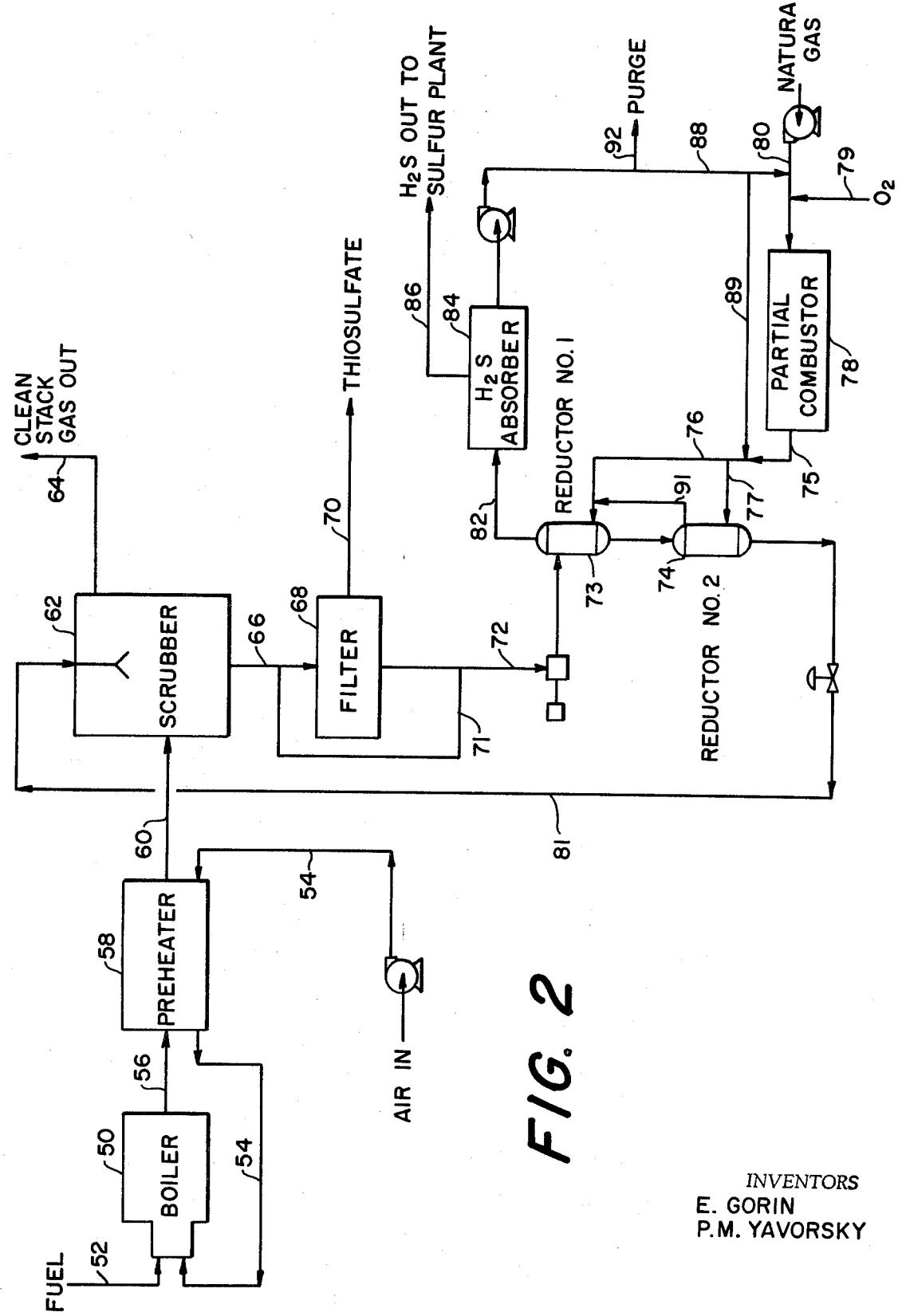
FIG. 2 is a schematic flowsheet of the modification of the process of this invention which includes the two-zone regeneration process.

Referring to FIG. 2, and alternative embodiment of the process of the present invention is shown in which the formate in molten form is used as the $SO_2$-absorbing agent. A different regeneration procedure from that shown in FIG. 1 is used to demonstrate that there are other ways available for regenerating the formate. Numeral 50 designates any conventional steam boiler heated by the combustion of a sulfur-containing fuel, e.g. coal, introduced through a conduit 52 with air introduced through a pipe 54. Hot flue gas containing $SO_2$ is conducted by a pipe 56 to an air preheater 58 for heat exchange with the incoming air carried by the pipe 54. The flue gas is then passed through a pipe 60 to a scrubber 62 for removal of $SO_2$, in a manner to be more fully described below. The resulting flue gas of reduced or zero $SO_2$ content is discharge through a stack 64.

The scrubber 62 is any conventional gas-liquid scrubbing tower designed to assure contact of the hot flue gas with the selected formate, in this instance potassium formate in a molten state, at a temperature between the melting point and 400° F., e.g. 350° F. The hot flue gas is scrubbed free, or substantially so, of $SO_2$ in the scrubber 62 by contact with the molten potassium formate. The $SO_2$-free gas is discharged through the stack 64 as clean stack gas. Since the stack gas is at an elevated temperature, its plume does not fall to ground level, but rises and diffuses into the upper atmosphere.

The chemical reaction occurring in the scrubber 62 is that set forth above in Equation 2. The $CO_2$ produced in the reaction is discharged with the stack gas through stack 64. The reaction is suitably regulated to provide for the conversion of between about 7 to 25 percent by weight of the formate to the thiosulfate. The solubility of the thiosulfate in the molten formate is about 7 percent, so that the product leaving the scrubber is in the form of a slurry of the undissolved thiosulfate in the formate melt. If it is desired to recover any thiosulfate for use per se, for instance as a photographic fixing agent, then the slurry may be withdrawn from the scrubber 62 by a pipe 66 to a filter 68 where the thiosulfate and other entrained solids may be filtered and discharged through a conduit 70, for further purification of the thiosulfate.

However, we prefer to regenerate formate from all the thiosulfate for reuse in the treatment of flue gas. Accordingly, the $SO_2$-free thiosulfate-formate slurry is pumped around the filter 68 by a by-pass line 71 to a pipe 72 which leads to the first of two reduction zones suitably housed in interconnected vessels designated by the numerals 73 and 74, respectively, and also identified by the legends reductor No. 1 and reductor No. 3, respectively. A suitably regulated stream of CO and $H_2$ is fed to each of the reductors by a main pipe 75 with spur pipelines 76 and 77 leading respectively to vessels 73 and 74. The stream of CO and $H_2$ is blended with recycle gas from line 89. The main pipe 75 is supplied with the reducing gas CO and $H_2$ produced in any suitable manner. The preferred gas composition is one that has a $CO/H_2$ mole ratio of about 1:1. Such a gas may be generated in a partial combustion zone 78 using oxygen from line 79 and natural gas from line 80, blended with a $CO_2$-rich recycle gas from line 88.

Other suitable means of supplying $CO/H_2$ may be used, such as partial combustion of fuel oil, catalytic reforming of natural gas with carbon dioxide-steam mixtures and by steam gasification of coal or coal char.

The partial combustor 78 may be operated at the same or preferably somewhat lower pressure level than the reductors Nos. 1 and 2. In the latter case, a compressor, not shown, would be installed in line 75 which delivers $CO/H_2$ gas to the regeneration system.

The preferred operating conditions for reductor No. 1 are as follows: a temperature between 500 and 700° F. and a minimum $CO+H_2$ pressure correlated with temperature as shown in Table II below.

TABLE II

Minimum CO and $H_2$ Pressure

| Temperature, ° F | 600 | 635 | 670 | 700 |
|---|---|---|---|---|
| CO + $H_2$ pressure (p.s.i.) | 435 | 650 | 890 | 1,230 |

The reaction conducted in reductor No. 2 is the conversion of the carbonate back to formate. The preferred operating conditions for this second reduction zone are as follows: a temperature between 600 and 700° F. and a pressure about 1000 p.s.i.g. above the equilibrium pressures given in Table II. The regenerated formate, together with unreacted formate, is recycled by pipe 81 to the scrubber 62. The effluent gases produced in reductor No. 2 are passed to reductor No. 1 through line 91. The effluent gases from reductor No. 1 are passed by pipe 82 to an $H_2S$ absorber 84 where the $H_2S$ is selectively removed from the effluent gases. The $H_2S$ is conducted by a pipe 86 to a sulfur recovery plant. The $H_2S$-free effluent gases are recycled in part by pipes 88 and 89 back to the reductors Nos. 1 and 2. Another part is passed through pipes 88 and 80 to the partial combustion unit 78 where it is blended with natural gas feed. Finally, some of the gas is purged from the system through line 92 to prevent accumulation of impurities.

DESCRIPTION OF THE PROCESS WITH ONE-ZONE REGENERATION

Referring to FIG. 3 of the drawings, $SO_2$-containing gas is introduced into the bottom of a scrubber 100 through a conduit 102 while the selected formate (preferably concentrated aqueous potassium formate, e.g. 70–75%) is fed into the top of the scrubber through a conduit 104. The scrubber may be any conventional gas-liquid scrubbing tower designed to assure contact of the $SO_2$-containing gas at elevated temperatures with the selected formate in a liquid state. We prefer to use a jiggling bed of marbles through which the gas and liquid pass in countercurrent flow relationship. The temperature within the scrubber is preferably maintained between 170 and 200° F. when concentrated aqueous potassium formate is the absorbent. This temperature range has the advantage of eliminating the need for reheat of the scrubbed gases when they are released to the atmosphere. The scrubbed gas, freed of $SO_2$, or substantially so, is discharged through a stack 106 as clean stack gas.

The relative amounts of $SO_2$-containing gas and formate passing through the scrubber are regulated to provide for considerable excess of the formate, so that less than 25 percent by weight of the formate is converted to the thiosulfate. Accordingly, the major constituents of the effluent liquid stream leaving the bottom of the scrubber through conduit 108 are aqueous potassium formate and potassium thiosulfate. These are circulated through a filter 110 by a pump 112 to the top of a stirred formate regenerator vessel 114 wherein the thiosulfate is reduced in a single stage to the formate by reaction with excess formate and with CO introduced through a conduit 116 into the bottom of the vessel 114. Additional water may be added through a conduit 117, if necessary. The temperature maintained in the regenerator is about 540° F., and the pressure held at about 1000 p.s.i.g. The residence time is about two hours. The gaseous product composed of $H_2S$ and $CO_2$ is discharged through a stack 118, while the regenerated aqueous formate is recycled to the scrubber through the conduit 104 after suitable adjustment of its concentration.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A cyclic process for removing sulfur dioxide from hot gas containing sulfur dioxide which comprises
    (a) scrubbing said gas with a liquid absorbent selected from the group consisting of sodium, potassium, and ammonium formates at a temperature above 140° F. and below 475° F., whereby sulfur dioxide is removed from said gas and a partially spent absorbent is produced which contains unused formate and a thiosulfate corresponding to the formate used, (b) reducing said thiosulfate to formate by reaction with formate and a reducing gas containing CO at a temperature above 475° F., to yield a regenerated absorbent, and (c) recycling said regenerated absorbent for use in the scrubbing step.

2. A process according to that of claim 1 wherein the $SO_2$ content of the hot gas is less than 2 percent by volume.

3. A process according to that of claim 2 wherein the absorbent is aqueous potassium formate.

4. A process according to that of claim 2 wherein the absorbent is aqueous sodium formate.

5. A process according to that of claim 2 wherein the absorbent is aqueous ammonium formate.

References Cited

UNITED STATES PATENTS

| | | | |
|---|---|---|---|
| 1,036,705 | 8/1912 | Portheim | 23—116 |
| 1,166,160 | 12/1915 | Portheim | 23—116 |
| 2,010,615 | 8/1935 | Vanderbilt et al. | 23—116 |
| 2,031,802 | 2/1936 | Tyler | 23—178 |
| 2,142,987 | 1/1939 | Bacon et al. | 23—178 |
| 3,411,875 | 1/1968 | Yoshikawa et al. | 23—116 |
| 3,576,598 | 4/1971 | Plentovich et al. | 23—116 |
| 3,584,042 | 6/1971 | Yavorsky et al. | 23—115 X |
| 3,592,850 | 7/1971 | Mazzocco et al. | 23—115 X |

OTHER REFERENCES

Goliath et al.: "Mechanism of Reduction of Sulfur Dioxide by Formic Acid," Acta Chemica Scandinavica, vol. 16, No. 3, 1962, pp. 570–574.

EARL C. THOMAS, Primary Examiner

U.S. Cl. X.R.

423—514, 540; 260—542